(12) United States Patent
Garrett et al.

(10) Patent No.: US 8,547,833 B2
(45) Date of Patent: Oct. 1, 2013

(54) SYSTEMS AND METHODS FOR DETERMINING BITLOADING

(75) Inventors: Albert L. Garrett, Gadsden, AL (US); Jack Thomas Matheney, Madison, AL (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 13/107,555

(22) Filed: May 13, 2011

(65) Prior Publication Data
US 2012/0287979 A1 Nov. 15, 2012

(51) Int. Cl.
*H04L 1/00* (2006.01)

(52) U.S. Cl.
USPC .......................................... 370/229; 370/252

(58) Field of Classification Search
USPC ........................... 370/229–235, 241, 252, 253
See application file for complete search history.

(56) References Cited

U.S. PATENT DOCUMENTS

| | | |
|---|---|---|
| 7,567,613 B2 | 7/2009 | Fossion et al. |
| 8,194,558 B2 * | 6/2012 | Choi et al. ................ 370/252 |
| 2001/0031016 A1 | 10/2001 | Seagraves |
| 2005/0128998 A1 * | 6/2005 | Jelitto et al. ................ 370/349 |
| 2005/0190826 A1 | 9/2005 | Van Bruyssel et al. |
| 2009/0323684 A1 | 12/2009 | Chu et al. |
| 2010/0254442 A1 | 10/2010 | Cendrillon et al. |

OTHER PUBLICATIONS

SCTE Implication Paper, "Deploying Enhanced Media Services with MoCA, The Challenges and Rewards of MoCA Deployment for the Home Network", Published by Society of Cable Telecommunications Engineers, SCTE Professional Development, (date Unknown), pp. 1-29.

Tom Lookabaugh, "Home Entertainment Networking, MoCA Home Networking Makes Sense for Cable Operators Everywhere", May 6, 2010, pp. 1-7.

Shlomo Ovadia, "Home Newtorking on Coax for Video and Multimedia, Overview for IEEE 802.1AVB, MoCA—Multimedia over Coax Alliance", www.MoCAlliance.org, May 30, 2007, pp. 1-15.

* cited by examiner

*Primary Examiner* — Kerri Rose
(74) *Attorney, Agent, or Firm* — Tarolli, Sundheim, Covell & Tummino LLP

(57) ABSTRACT

A method can include calculating an indication of signal quality for a communications channel based on a message from a node over a communications channel of a network. The calculated indication of signal quality can be adjusted based on a prior indication of signal quality to provide an adjusted indication of signal quality. Bitloading for the communications channel can be determined based on the adjusted indication of signal quality.

24 Claims, 5 Drawing Sheets

SYSTEMS AND METHODS FOR DETERMINING BITLOADING

TECHNICAL FIELD

The present disclosure relates to systems and methods for determining bitloading in a communications system.

BACKGROUND

Physical layer communication technologies can employ bitloading to control the rate of data that is carried over a respective channel. For instance, control algorithms can set the number of bits on a given channel based on a signal-to-noise ratio (SNR) determined for each channel. As one example, the Multimedia over Coax Alliance (MoCA) standards allow bitloading of each subcarrier to be controlled based on the physical characteristics of the path between transmitting and receiving nodes.

DESCRIPTION OF EXAMPLE EMBODIMENTS

Overview

This disclosure relates to systems and methods for determining bitloading. In one example embodiment, a method can include calculating an indication of signal quality for a communications channel based on a message from a node over a communications channel of a network. The calculated indication of signal quality can be adjusted based on a prior indication of signal quality to provide an adjusted indication of signal quality. Bitloading for the communications channel can be determined based on the adjusted indication of signal quality.

Example Embodiments

Figure 1:
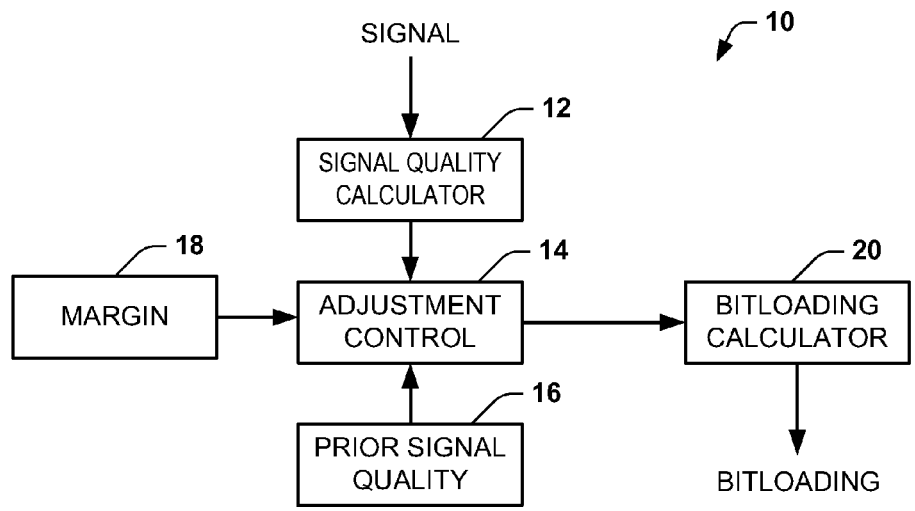
FIG. 1 illustrates an example system for determining bitloading.

FIG. 1 depicts an example of a system 10 configured to determine bitloading for a communications channel in a network. The network can include a plurality of nodes, such as a node at which the system 10 is implemented and one or more other nodes. Each of the nodes can communicate with the other nodes in the network over a communications medium. The system 10 includes a signal quality calculator 12 that computes an indication of signal quality in response to a signal that is transmitted from another node in the network. As used herein the indication of signal quality for a given channel corresponds to a measure of the physical characteristics of the path between transmitting and receiving nodes. The indication of signal quality can correspond to a noise measurement, a signal power measurement, or a combination of noise and signal power measurements over a channel.

By way of example, the signal quality calculator 12 can compute a signal to noise ratio (SNR), which represents a ratio of signal power and noise power. As another example, for a digitally modulated signal, the signal quality calculator 12 can compute a modulation error ratio (MER), which corresponds to a measure of the SNR in a digitally modulated signal. The signal quality calculator 12 can compute other indications of signal quality, such as including a carrier-to-noise ratio and/or signal strength.

An adjustment control 14 is configured to dynamically modify the measure of signal quality and provide an adjusted indication of signal quality. The adjustment control 14 can adjust the measure of signal quality based on a prior measure of signal quality 16 and a noise margin 18 that has been defined for a physical (PHY) layer of the network, which is referred to herein as a PHY margin for the network. As used herein, the PHY margin corresponds to an amount by which a signal exceeds the minimum amount for proper operation. The PHY margin can be implemented as a ratio by which the signal exceeds the minimum acceptable amount. The PHY margin can be measured in decibels (dB). For instance, certain types of networks impose a network PHY margin in network to account for worst-case non-stationary noise variance such as due to ingress noise. This PHY margin can be fixed for the network.

The prior measure of signal quality 16 and the margin 18 can be stored in memory for the system 10. The prior measure of signal quality 16 can include a historical and/or statistical set of signal quality values for each channel for which the signal quality calculator 12 computes the measure of signal quality. For example, the prior signal quality values can include, a set of the worst signal quality measurements (e.g., having most noise), a set of the best signal quality measurements (e.g., having the least noise) or a combination of both the best and worst signal quality measurements for each channel.

The adjustment control 14 can compare the current signal quality measurement (e.g., as computed by the signal quality calculator 12) relative to the prior signal quality measurement to control adjusting the indication of signal quality. As an example, if the adjustment control 14 determines that indication of signal quality represents a signal quality that includes significant spurious noise (e.g., a near worst-case signal quality), the adjustor can increase the indication of signal quality. For instance, the adjustor can increase the indication of signal quality based on the margin 18. In contrast, if the adjustment control 14 determines that indication of signal quality is substantially free from spurious noise, the adjustor can pass the signal quality measurement unchanged to the bitloading calculator 20. The determination that the signal is substantially free of spurious noise can be performed based on the prior signal quality measurement 16, which can include a set of best or worst signal quality for a given channel.

In the example of FIG. 1, the adjustment control 14 provides the adjusted indication of signal quality to a bitloading calculator 20. The bitloading calculator 20 is configured to determine bitloading based on the indication of signal quality provided by the adjustment control 14. The bitloading calculator 20 can determine bitloading for each channel for which signal quality has been determined for signals transmitted to the system 10. The bitloading calculator 20 can be implemented as an algorithm programmed to compute bitloading based on the indication of signal quality provided by the adjustment control 14. Alternatively or additionally, the bitloading calculator 20 can be implemented as a look-up table programmed to provide an appropriate bitloading parameter based on the indication of signal quality being provided as an input to the look-up table. As yet another example, the bitloading calculator can operate as both an algorithm and a look-up table operative to determine the bitloading parameter. The bitloading parameter can be transmitted to the node that sent the signal for which the signal quality was measured.

As an example, the bitloading calculator 20 may decrease the indication of signal quality provided by the adjustment control 14 based on the margin 18 and determine bitloading based on such decreased indication of signal quality. This is performed in certain types of networks to compensate for expected worst-case non-stationary (e.g., spurious) noise variance, such as due to ingress noise into the network. The Multimedia over Coax Alliance (MoCA) standards, including the MoCA 1.0 standard, the MoCA 1.1 standard and the MoCA 2.0 standard, provide examples of such a network and one in which the system 10 can be implemented to afford improved PHY rates. As used herein, PHY rate refers to a rate of data communication over a physical layer in a network, such as over an electrically conductive cable, optical fiber or wireless media. In such a network, if bitloading were determined while significant ingress noise is present on the communication medium, the result can be significantly reduced PHY rates due to the decreased bitloading determined from the combined effects of the imposed PHY margin and the detected ingress noise, which results in a corresponding reduction in the PHY rate.

The signal quality calculator 12, adjustment control 14 and the bitloading calculator 20 can be implemented as dedicated hardware, software or a combination of hardware and software configured to perform the functions disclosed herein. For the example of a hardware-based implementation, such hardware can be implemented as an application specific integrated circuit (ASIC), a field programmable gate array (FPGA), combinational logic, registers, gates, other circuitry or as a combination thereof.

Figure 2:
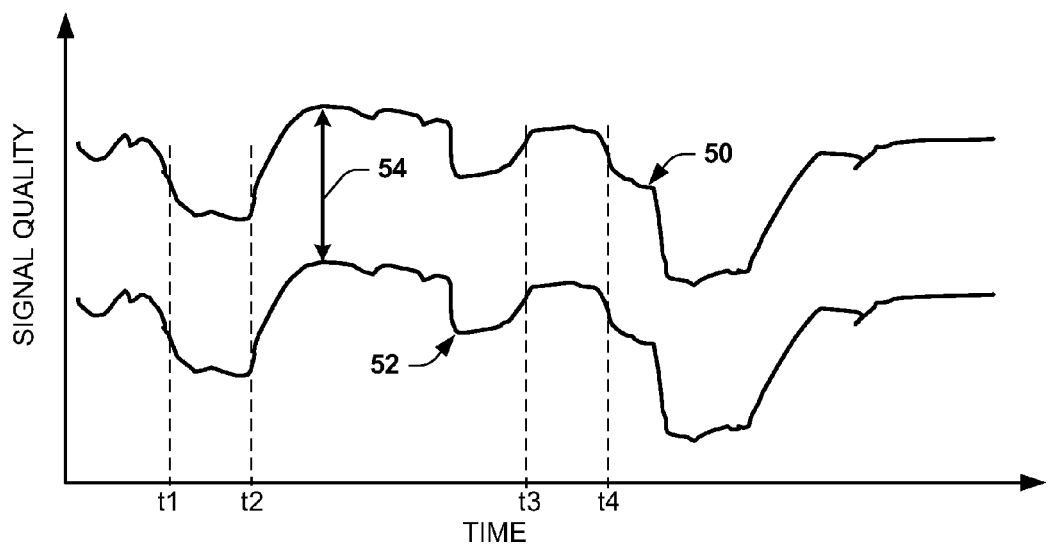
FIG. 2 illustrates a graph demonstrating an example of signal quality as a function of time.

FIG. 2 is a graph depicting an example of signal quality (e.g., SNR, such as can be determined by the signal quality calculator 12 of FIG. 1) as a function of time. The graph includes a first waveform 50 and a second waveform 52. The second waveform 52 demonstrates the effect that the PHY margin, demonstrated at 54, might have on the signal quality as used for determining bitloading. The signal quality waveform 52 represents the signal quality measurements of waveform 50 reduced by the PHY margin 54. As mentioned above, for a network that applies a fixed PHY margin for bitloading operations, the PHY margin is combined with the signal quality (e.g., SNR) measurements to compensate for non-stationary ingress noise. This non-stationary ingress noise, for example, can be significant for certain types of networks, such as networks implemented according to one of the MoCA standards. For example, such non-stationary noise can ingress into a MoCA network due to motors and other electrical devices being operated in a facility (e.g., a home) implementing the MoCA network.

By way of example, if signal quality is measured between times t1 and t2, corresponding to a high-noise condition, the addition of the PHY margin to such measurements would decrease the signal quality significantly. That is, the PHY margin is intended to compensate for effects of non-stationary noise. Therefore, if such non-stationary noise is present during such measurements, such as between times t1 and t2, the PHY margin operates to effectively reduce the signal quality. This can result in undesirably low bitloading. In contrast, if signal quality is measured between times t3 and t4, corresponding to a high-SNR condition, the addition of the network-imposed PHY margin to such measurements operates as intended, such that bitloading can be determined to set a desirable PHY rate designed to allow for the ingress of non-stationary noise into the network channel.

Figure 3:
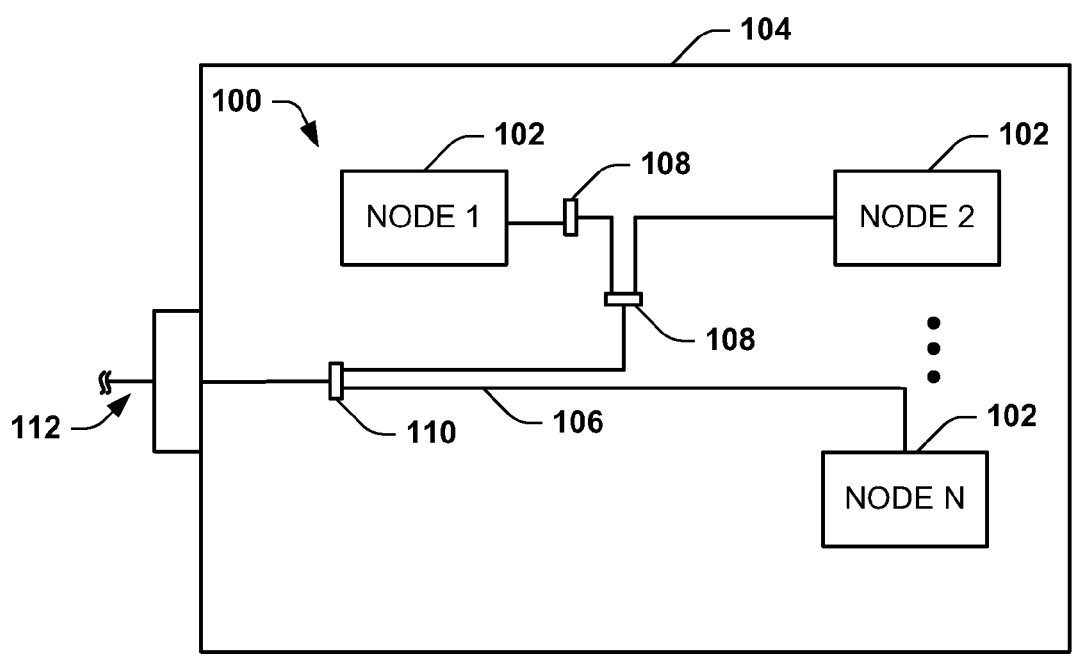
FIG. 3 illustrates an example network demonstrating an arrangement of nodes operative to determine bitloading.

FIG. 3 depicts an example of a network 100 that includes a plurality of nodes 102, demonstrated as NODE 1, NODE 2 and NODE N, where N is a positive integer denoting the number of nodes. In the example of FIG. 3, the network 100 is implemented within a facility 104, such as a home or a business. Each of the nodes 102 is connected to each other over a communication medium 106, which can be a wired network, an optical network or a wireless network.

As an example, the communication medium 106 can include a coaxial cable plant within the facility 104, such that the network operates over the physical topology of the coaxial cable plant in the facility. For instance, each of the nodes 102 can be connected to each other via lengths of coaxial cable and associated splitters 108. A root splitter 110 can connect to a service provider's drop 112 via a length of coaxial cable. The operation of the network 100 can vary depending on the communication medium and the network topology.

As another example, the network 100 can be implemented as a meshed point-to-point network in which each of the nodes 102 establishes a bi-directional connection with each of the other nodes in the network, such as according to one of the MoCA standards described herein. In such an example, each node can be implemented as a set top box, such that the network can be utilized for transporting multiple streams of high-definition multimedia content and co-exists with services (e.g., cable services, satellite audio-video services, high-speed internet service, and the like). For instance, one of the nodes 102 can store content in memory that can be streamed from such node to other nodes via the network 100.

By way of further example, at the physical layer, the network 100 can employ an orthogonal frequency divisional multiplexing (OFDM) or adaptive constellation multi-tone (ACMT) modulation technique to carry data between nodes 102. Units of data (named ACMT symbols) are mapped onto a set of orthogonal subcarriers that occupy a channel bandwidth. For the MoCA 1.0 and 1.1 standards, each channel may have a bandwidth of about 50 MHz located in the spectrum from about 850 MHz to about 1525 MHz. Other channel bandwidths and spectrums can be utilized for other standards. Each of the subcarriers provides a channel that can be modulated independently with respective a number of bits per symbol as specified by bitloading parameters. Each given node 102 is configured to set bitloading parameters for communication transmissions sent from the given node to each of the other nodes over respective channels. Thus, each node 102 can determine and store a modulation profile that specifies bitloading attributes for transmissions from each respective node.

For example, a given node 102 can determine its bitloading as part of a node admission process for the given node. The node admission process can be implemented so that each node 102 sends a probe message to each of the other nodes and receives a report response from the other nodes that includes bitloading information for setting bitloading parameters for each channel. Periodic bitloading updates can also be performed as part of a link maintenance operation for each of the nodes 102. As a further example, the bitloading can be updated at other intervals, which may be synchronous or asynchronous. The interval may be controlled by each node 102 and can be the same or different for nodes in the network 100. The bitloading determination can be performed by each node according to the approaches disclosed herein (e.g., see FIGS. 1, 4 and 5).

Figure 4:
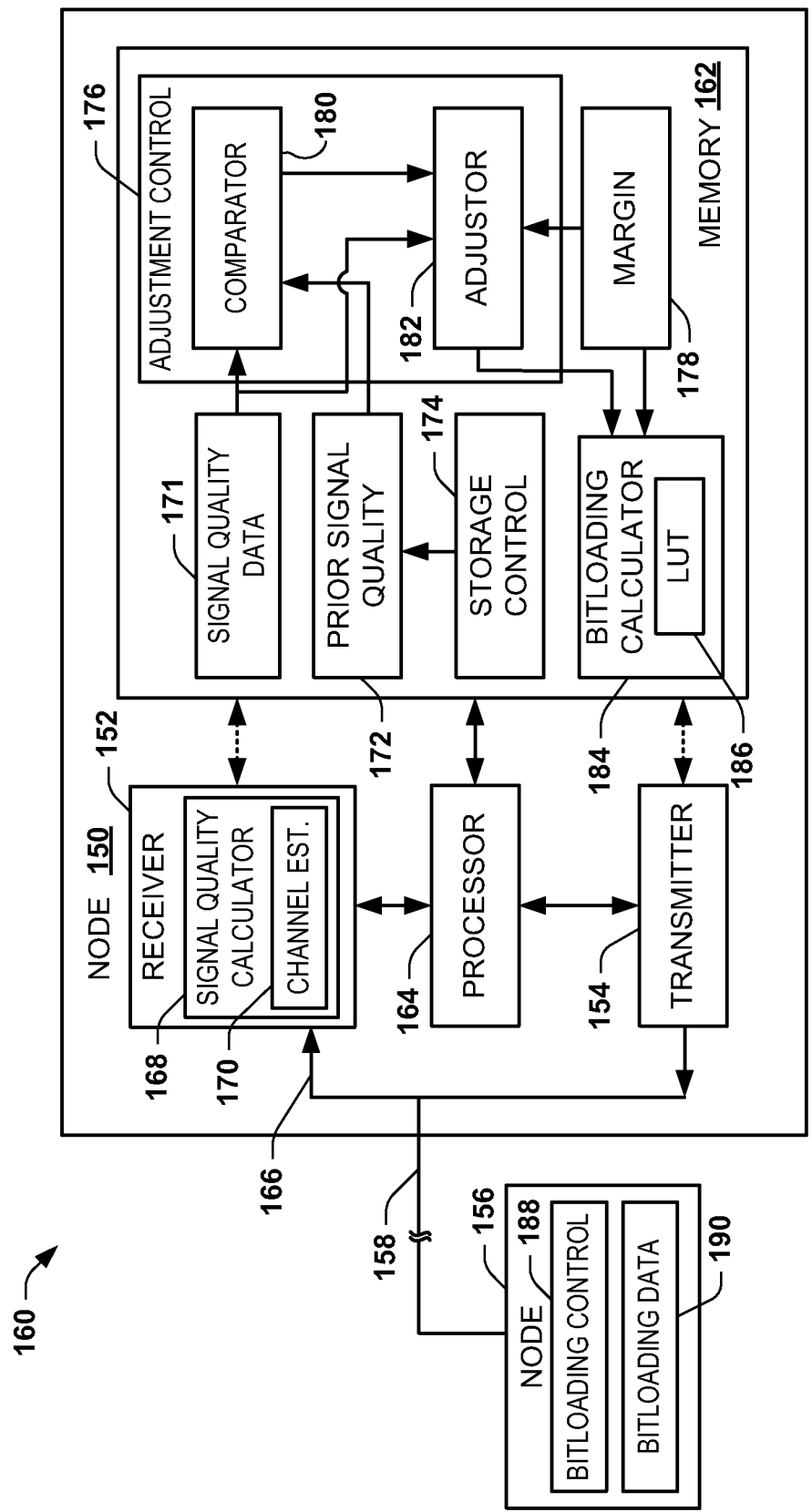
FIG. 4 illustrates an example node for determining bitloading.

As a further example, FIG. 4 depicts an example of a node 150 configured for determining bitloading parameters. The node 150 can correspond to any of the nodes 102 demonstrated in the example network system 100 of FIG. 3. Thus, reference may be made back to FIG. 3 and its corresponding description for additional context.

In the example of FIG. 4, the node 150 includes a receiver 152 and a transmitter 154 connected to one or more other nodes 156 via a network communications medium 158. The nodes 150 and 156 and the communications medium 158 form a network system 160 (e.g., the network system of FIG. 3). The network communications medium 158 can vary depending on the type of network system such as described herein. While the receiver 152 and transmitter 154 are demonstrated in FIG. 4 as being separate, the receiver and transmitter can be part of an integrated transceiver configured to receive and send signals via the communications medium 158. Each of the nodes 150 and 156 in the network 160 can be identically configured, including hardware and software operative to determine bitloading as well as for receiving and processing bitloading information from other nodes. Nodes in the network 160 further may be configured differently, such as may vary depending on application requirements. For simplicity of illustration, the node 156 is demonstrated as including a bitloading control 188 and memory for storing bitloading data 190 but also includes a transmitter and receiver and other components to communication in the network.

The node 150 can also include memory 162 and a processor 164. The memory 162 can store computer readable instructions and data. For instance, the memory 162 can comprise physical memory such as can reside on the processor 164 (e.g., processor memory), random access memory, or other physical storage media (e.g., a CD ROM, DVD, flash memory, hard drive, etc.) or a combination of different memory devices that can store the computer readable instructions and data. Such memory devices can be implemented within a given node 150 or elsewhere within the network system 160. The processor 164 can access the memory 162 and execute corresponding computer readable instructions.

In the example of FIG. 4, the processor 164 can execute machine readable instructions from the memory 162 comprising code portions programmed to determine bitloading. The processor 164 can also be connected to the receiver 152 and the transmitter 154, such as for controlling their operation. The processor 164 can also receive and process signals received by the receiver 152 and send output signals for transmission by the transmitter 154.

By way of example, the receiver 152 can receive a signal at an input 166 thereof, such as provided from another node 156 in the network system 160. The signal can correspond to a probe message, a link maintenance message or a content data message (e.g., a packet of high-speed audio-video data).

The receiver 152 can include a signal quality calculator 168 configured to compute a measure of signal quality in response to the signal that is transmitted from the other node 156 in the network 160. For example, the signal quality calculator 168 can be implemented in the receiver 152 as dedicated hardware (e.g., an FPGA, an ASIC, a digital signal processor, combinational logic, or the like) for computing the signal quality measurements based on the received signal. The signal quality can correspond to a noise measurement, a signal power measurement, a combination of noise and signal power measurements of the signal at the receiver input 166.

As an example, the signal quality calculator 168 can employ channel estimation circuitry 170 to determine a noise level and signal level for a set of tones in a given communications channel. For example, the channel estimation function 170 can be implemented as combinational logic or other logic or circuitry configured to compute SNR for signals received for the node 150 on each channel. The signal quality calculator 168 can determine other measures of signal quality and/or noise, such as described herein. One or more of the signal quality measurements can be provided to the processor 164 stored as signal quality data 171 in the memory 162 for use determining bitloading. For instance, the signal quality data 171 can include one or more measurements for an individual received signal or it can be an average measurement for a set of sampled signals received by the receiver 152.

As one example, the signal quality calculator 168 can compute a measure signal quality for certain predetermined types of signals, such as including probe messages or link maintenance messages from another node. Such messages can be detected by the node 150 in response to header data specifying the message as one of the predetermined type of message for which signal quality is to be measured. As an alternative example, the channel estimation function 170 of the signal quality calculator 168 can operate to determine signal quality for each signal received by the receiver from another node in the network system 160. As yet another alternative example, the signal quality calculator 168 can determine signal quality for signals according a predetermined periodic interval, which may be programmable.

The receiver 152 can also include circuitry (not shown) to process the signal, such as including a demodulator, filters, analog-to-digital converters and the like. The receiver 152 can provide the demodulated signal as digital data to the processor 164 for additional processing, such as based on computer readable instructions stored in the memory 162. Additionally or alternatively, the receiver 152 can directly access the memory, as demonstrated schematically by a dotted line.

As another example, the node 150 determining bitloading can request other one or more other nodes 156 in the system 160 to modify transmissions to facilitate determining signal quality. For instance, the processor 164 of the node 150 can control the transmitter 154 to send one or more of the other nodes 156 a request to include one or more additional tones to facilitate determining signal quality for one or more channels by the channel estimation function 170. The node 150 can send the request to allow the node to determine signal quality more frequently than the rate at which LMO updates are performed.

As demonstrated in FIG. 4, prior signal quality data 172 can be stored in the memory 162 for one or more signal quality measurements determined by the signal quality calculator 168. For example, the prior signal quality data 172 can include data structure that contains a historical or statistical representation of the signal quality for one or more signal quality measurements for each channel utilized for communication by the node 150 in the network system 160.

Storage control 174 can be programmed to analyze and control storage of the signal quality measurements in the memory 162. The storage control 174 can be programmed to store a set of one or more signal quality measurements based on the signal quality of the measurements computed by the signal quality calculator 168 and stored as the signal quality data 171. As an example, the storage control 174 can be programmed to store a set of the worst signal quality measurements (e.g., determined as having the most noise), a set of the best signal quality measurements (e.g., determined as having the least noise) or a combination of both the best and worst signal quality measurements. Such signal quality measurements can be stored, for example, for signals having a signal quality that is above a first signal quality threshold or below a second signal quality threshold, which thresholds can be programmed for each channel in the network system 160. The number of signal quality measurements stored in the signal quality data 172 can correspond to a number (e.g., fixed or variable number) of historical samplings, a statistical sampling of signal quality measurements, or a combination of a historical samplings and statistical data representing signal quality for each channel.

An adjustment control 176 can be programmed to modify a current signal quality measurement (e.g., corresponding to the signal quality data 171) and provide an adjusted measure of signal quality. The adjustment control 176 can adjust the current signal quality measurement based on the prior signal quality data 172 and a PHY margin for the network system 160. The PHY margin can be stored in the memory 162 as margin data 178. The PHY margin can be set by an automated process, a network administrator or other authorized user to establish a noise margin sufficient to compensate for ingress of non-stationary noise into the network system 160. For example, the PHY margin can be set to a value that is greater than or equal to a difference between a maximum noise level and a minimum noise level for the network.

By way of example, the adjustment control 176 can include a comparator function 180 programmed to compare the current signal quality measurement (e.g., corresponding to the signal quality data 171) relative to one or more prior signal quality measurements (e.g., the prior signal quality data 172). An adjustor 182 can be programmed to adjust the current signal quality measurement based on results of the comparison, demonstrated as a comparator output signal, and provide a corresponding indication of signal quality to a bitloading calculator 184. As an example, if the comparator function 180 determines that the indication of signal quality represents a signal quality that includes significant spurious noise (e.g., a near worst-case signal quality), the adjustor 182 can increase the indication of signal quality. For instance, the adjustor 182 can increase the indication of signal quality an amount based on the PHY margin 178 that has been set for the network system 160. In contrast, if the comparator 180 determines that the indication of signal quality is substantially free from spurious noise, the adjustor can pass the signal quality measurement unchanged to the bitloading calculator 184. As a further example, the bitloading calculator 184 can be programmed to decrease the indication of signal quality provided by the adjustment control 176 by an amount according to the margin 18 and determine the bitloading for the decreased indication of signal quality. In this way, the adjustment control 176 can adjust the signal quality measurement dynamically to help ensure a desired high PHY rate can be utilized for a given channel—even when signal quality is measured during spurious ingress noise. As a result, the network system 160 can maintain a desired high quality of user experience.

The bitloading calculator 184 can be programmed to determine bitloading for a given channel based on the indication of signal quality provided by the adjustor 182 of the adjustment control 176. As an example, the bitloading calculator 184 can be programmed to determine a bitloading parameter based on the PHY margin and the indication of signal quality provided by the adjustment control 14. The bitloading can define the number of bits per channel for modulation each subcarrier. For example, the bitloading parameter may specify bitloading that ranges from 1-8 bits per symbol, such as corresponding to binary phase shifted keying modulation to 256 quadrature amplitude modulation (QAM)). As an example, the bitloading calculator 20 can be implemented as including a look-up table (LUT) 186 programmed to output an appropriate bitloading level in response to the indication of signal quality provided by the adjustment control 176.

By way of further example, the following table demonstrates how adjusting signal quality measurements may affect the PHY rate. The table demonstrates signal quality for a given channel for a plurality of signal quality observations for a scenario when the signal quality is not adjusted (identified as a Baseline SNR column) and a scenario when the signal quality is adjusted as disclosed herein. In this example the signal quality is represented in the context of SNR. Noise level (NL) is also demonstrated for each of the observations. From the ten sample observations when signal quality is measured, it is shown that there is little difference in the PHY rate for a majority of observations. For situations observations 5 and 9 when impulsive ingress noise occurs during the SNR measurement, however, there are dramatic differences between the SNR baseline and the adjusted SNR. This difference, which is attributable to the dynamic adjustments to signal quality measurements disclosed herein, can have a significant impact on the resulting PHY rate, as demonstrated in the table.

TABLE I

| Observation Number | Measured Signal Level (dB) | Measured Noise Floor (dB) | Measured SNR (dB) | Network Margin (dB) | SNR Baseline (dB) | Adjusted SNR (dB) | PHY Rate Advantage % |
|---|---|---|---|---|---|---|---|
| 1 | −65 | −85 | 20 | 10 | 10 | 10 | 0.0 |
| 2 | −65 | −85 | 20 | 10 | 10 | 10 | 0.0 |
| 3 | −65 | −85 | 20 | 10 | 10 | 10 | 0.0 |
| 4 | −65 | −85 | 20 | 10 | 10 | 10 | 0.0 |
| 5 | −65 | −80 | 15 | 10 | 5 | 10 | 126.1 |
| 6 | −65 | −85 | 20 | 10 | 10 | 10 | 0.0 |
| 7 | −65 | −85 | 20 | 10 | 10 | 10 | 0.0 |
| 8 | −65 | −85 | 20 | 10 | 10 | 10 | 0.0 |
| 9 | −65 | −75 | 10 | 10 | 0 | 10 | 252.2 |
| 10 | −65 | −85 | 20 | 10 | 10 | 10 | 0.0 |

Returning to FIG. 4, the processor 164 can provide the determined bitloading parameter to the transmitter 154 for transmitting a report back to the node 156 that sent the signal for which the bitloading has been determined. The transmitter 154 can send the report as a message or response over the communications medium 158 to such node 156. The report message can contain bitloading information, such as control instructions or data, to enable the other node 156 to modify its bitloading for one or more channels. The report can include bitloading information for a single channel or it can include bitloading information for more than one channel.

The node 156 can include a bitloading control 188 configured to control bitloading for the channel according to the bitloading information contained in the report message. The bitloading control 188 can store the bitloading data 190 in corresponding memory for configuring its bitloading and resulting PHY rate for transmission of subsequent data from the node 156 to the node 150. The bitloading control 188 can set bitloading parameters for each channel over which the node 156 is operative to communicate in the network 160. As described herein, this process can be repeated during operation of the network system. The repeat rate can correspond to the link maintenance operation (LMO) that has been established for the network system 160. For example, the bitloading control 188 can cause the node 156 to transmit periodically a probe or LMO message to the node 150, such that the node 150 can provide bitloading information back in response to the message. Alternatively or additionally, the node 150 can control the rate of the updates, such as by sending requests to update the bitloading at more frequent rates.

Figure 5:
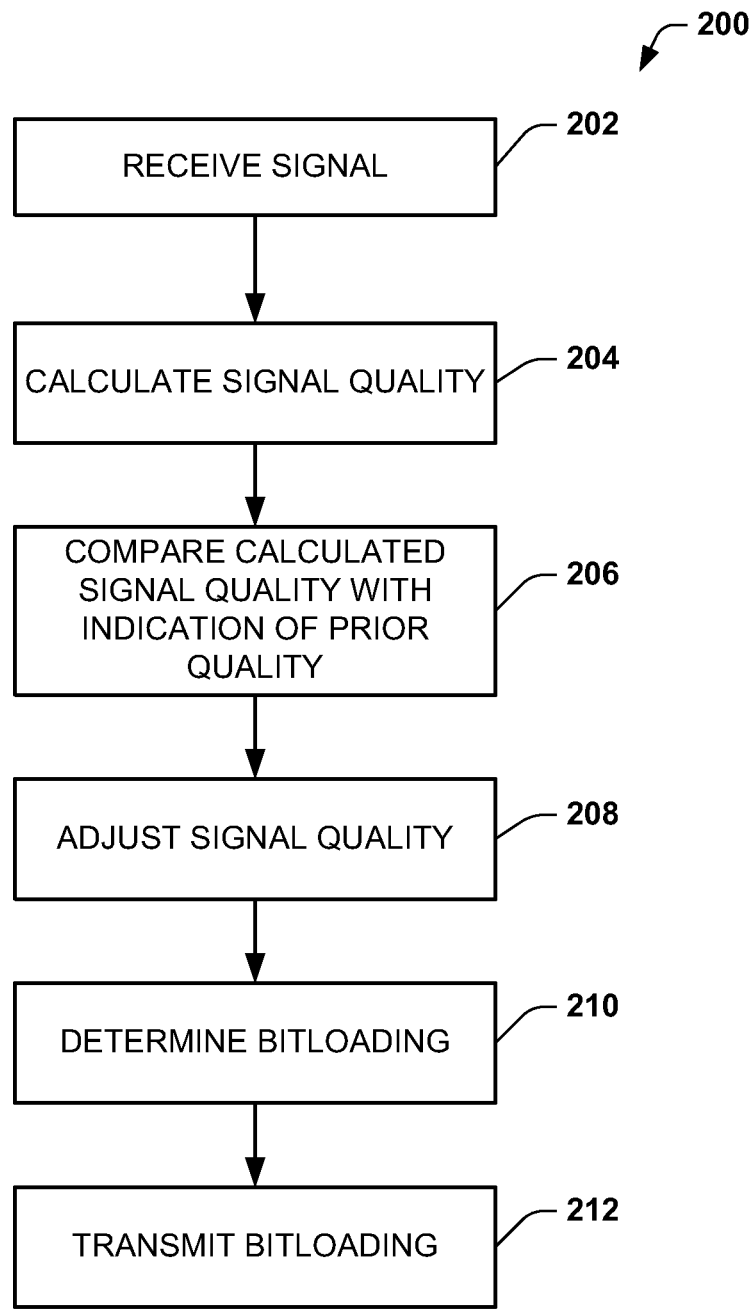
FIG. 5 illustrates an example method for determining bitloading for a communications channel.
Figure 6:
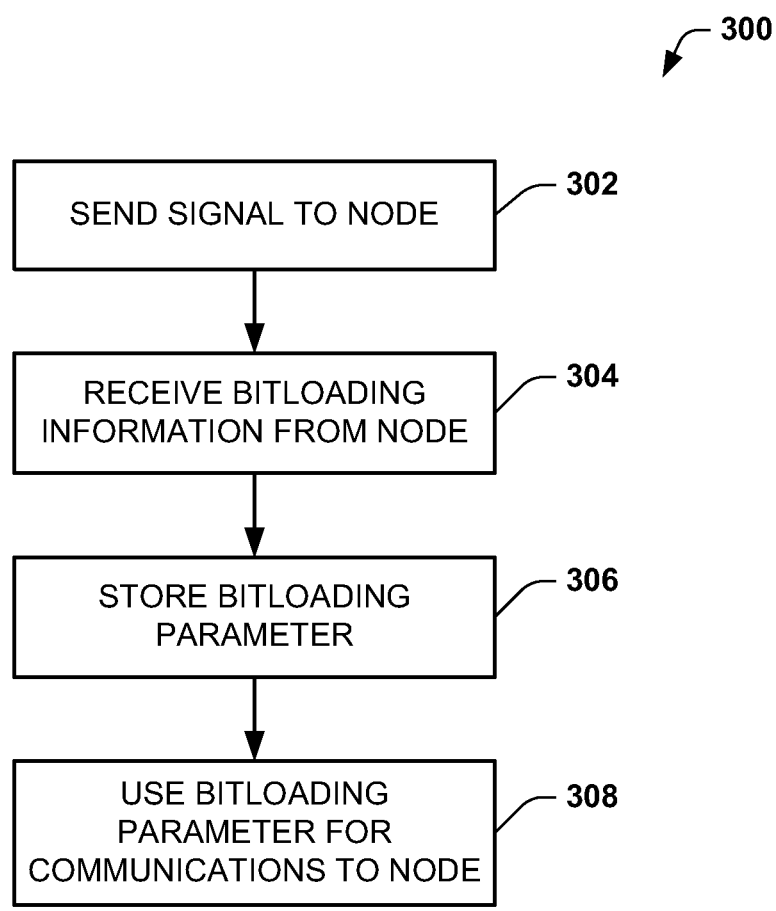
FIG. 6 illustrates an example method of using bitloading information for communication from a node.

In view of the foregoing structural and functional features described above, example method will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders and/or concurrently from that shown and described herein.

FIG. 5 illustrates a flow diagram of an example method 200 for determining bitloading. The method 200 begins at 202 in which a signal is received (e.g., by receiver 152 of FIG. 4) at a first node of a network. At 204, a measure of signal quality is calculated (e.g., by signal quality calculator 12 of FIG. 1 or 168 of FIG. 4) for a communications channel. The measure of signal quality can be computed based on a message transmitted from a second node over a communications channel of the network. For example, the measure of signal quality can be computed (e.g., by channel estimation function 170 of FIG. 4) as channel estimates for each of a plurality of tones in signals transmitted by the node over corresponding channels of the network to a second node.

At 206, the calculated signal quality can be compared (e.g., by comparator 180 of FIG. 4) with an indication of prior signal quality. At 208, the calculated signal quality measurement can be adjusted (e.g., by adjustment control 14 of FIG. 1 or adjustor 182 of FIG. 4) based on the comparison (at 206) to provide an adjusted indication of signal quality. For instance, at 208, the indication of signal quality can be dynamically adjusted or it may be not adjusted based on the comparison. At 210, a bitloading parameter can be determined. The bitloading parameter can be determined (e.g., by bitloading calculator 20 of FIG. 1 or 184 of FIG. 4) based on the adjusted indication of signal quality. The bitloading parameter can be transmitted to the second node for configuration subsequent transmissions to the first node.

FIG. 6 depicts a flow diagram of an example method 300 for setting bitloading for communications in a network. The method 300 begins at 302 in which a first node sends a message to a second node. The message can be virtually any type of one or more communications from which the second node can determine bitloading (e.g., according to the method of FIG. 5). The message can be sent in response to a request send from the second node, such as can be utilized to control the content of the message being sent to facilitate the bitloading determination. Alternatively or additionally, the message can be a probe message from the first node or be provided as part of link maintenance operation such as described herein.

At 304, the first node receives bitloading information from the second node. The bitloading information can be contained in a communication (e.g., a report) from the second node to establish bitloading for subsequent communications from the first node to the second over a given communications channel (e.g., a subcarrier). The second node can determine bitloading by adjusting signal quality measurements according to any of the example embodiments disclosed herein. As one example, the bitloading information provided by the second node can be either (i) a first bitloading value that is determined at the second node based on a measure of signal quality by the second node, or (ii) a second (adjusted) bitloading value that is determined at the second node based on a measure of signal quality at the second node dynamically adjusted according to a prior indication of signal quality at the second node to account for non-stationary noise in the communications channel. As disclosed herein, if bitloading is determined from an adjusted measure of signal quality, higher bitloading can be realized resulting in increased PHY rates for the communications channel. At 306, a bitloading parameter can be stored in memory of the first node to update bitloading for the communications channel.

At 308, the received bitloading parameter can be used for communications from the first node to the second node over the communications channel. The method 300 can be performed at each node in the network to establish bitloading for each communications channel (e.g., subcarrier) in the network.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. An apparatus comprising:
a signal quality calculator configured to compute an indication of signal quality based on a signal received via a network from a node;
an adjustment control to dynamically adjust the indication of signal quality based on a prior indication of signal quality and a margin defined for the network and to provide an adjusted indication of signal quality, wherein the adjustment control is to increase the indication of signal quality by an amount based on the margin defined for the network to provide the adjusted indication of signal quality; and
a bitloading calculator configured to determine a bitloading attribute for use in communication from the node based on the adjusted indication of signal quality.

2. The apparatus of claim 1, wherein the node is a first node, the apparatus further comprising:
a receiver connected to the network to receive the signal transmitted from the first node; and
a transmitter co-located with the receiver in another node of the network, the transmitter configured to send a report message to the first node via the network, the report message comprising the bitloading attribute for use in subsequent communication from the first node to another node that includes the receiver.

3. The apparatus of claim 2, wherein the signal quality calculator further comprises a channel estimation function to provide channel estimates for each of a plurality of tones in signals transmitted by the first node over the network to the receiver, the signal quality calculator being configured to derive the indication of signal quality based on the channel estimates.

4. The apparatus of claim 2, wherein the signal quality calculator is configured to calculate the indication of signal quality for each signal from the node received by the receiver, the apparatus further comprising memory to store a plurality of signal quality measurements, corresponding to the prior indication of signal quality.

5. The apparatus of claim 4, further comprising storage control configured to store in memory a predetermined number of the plurality of signal quality measurements depending on signal quality of the signals received by the receiver.

6. The apparatus of claim 5, wherein the storage control is configured to store the predetermined number of the plurality of signal quality measurements for signals received by the receiver of a worst signal quality.

7. The apparatus of claim 5, wherein the storage control is configured to store in memory the predetermined number of the plurality of signal quality measurements corresponding to a first set of signal quality measurements having an unacceptable signal quality and a second set of signal quality measurements having an acceptable signal quality.

8. The apparatus of claim 4, further comprising storage control configured to store a subset of the plurality of signal quality measurements acquired over a moving time window.

9. The apparatus of claim 1, wherein the adjustment control further comprises:
a comparator configured to provide an comparator signal based on the prior indication of signal quality relative to the indication of signal quality provided by the signal quality calculator; and
an adjustor operative to adjust or to not adjust the indication of signal quality selectively depending on the comparator signal.

10. The apparatus of claim 2, wherein the prior indication of signal quality comprises a historical set of signal quality measurements stored in memory for signals transmitted on the network by the first node to the receiver of the another node.

11. The apparatus of claim 2, wherein the prior indication of signal quality comprises a statistical indication of signal quality measurements stored in memory for signals transmitted on the network by the first node, the statistical indication of signal quality measurements being determined based on a plurality of indications of signal quality provided by the signal quality calculator.

12. The apparatus of claim 1,
wherein the node is a first node,
wherein the network comprises a plurality of the nodes,
a second of the plurality of nodes comprising the signal quality calculator, the adjustor and the bitloading calculator.

13. The apparatus of claim 12, wherein the network comprises a coaxial cable plant within a facility, each of the plurality of nodes are connected to each other over the coaxial cable plant, each of the plurality of nodes comprising respective ones of the signal quality calculator, the adjustor and the bitloading calculator.

14. A method comprising:
calculating at a first node of a network an indication of signal quality for a communications channel based on a signal transmitted from a second node over a communications channel of the network;
dynamically adjusting the calculated indication of signal quality based on a prior indication of signal quality and a margin defined for the network to provide an adjusted indication of signal quality, wherein the dynamic adjusting comprises increasing the indication of signal quality by an amount based on the margin defined for the network to provide the adjusted indication of signal quality in response to the indication of signal quality being below a predetermined threshold value; and
determining bitloading for the communications channel based on the adjusted indication of signal quality.

15. The method of claim 14, further comprising comparing at least one prior indication of signal quality relative to the indication of signal quality provided by the signal quality calculator, the calculated indication of signal quality being one of adjusted or not adjusted based on the comparison, the adjustment to the calculated indication of signal quality being made according to a noise margin of the network.

16. The method of claim 15, wherein the node comprises a first node, the method further comprising:
computing channel estimates at the first node for each of a plurality of tones in signals transmitted by at least one other the node over corresponding channels of the network to the first node; and
calculating the indication of signal quality for each of the corresponding channels based on the computed channel estimates.

17. An apparatus comprising:
a transmitter configured to transmit data over a communications channel of a network according to a bitloading parameter; and
a bitloading control configured to set the bitloading parameter based on bitloading information received from a remote node in the network, the bitloading information being one of based on a measure of signal quality at the node or based on an adjusted measure of signal quality, the adjusted measure of signal quality being based on prior signal quality measurements at the node for the communications channel as to account for non-stationary noise on the communications channel, wherein the adjusted measure of signal quality has been increased by an amount based on the margin defined for the non-stationary noise in the communications channel.

18. The apparatus of claim 17, further comprising a receiver configured to receive a message containing the bitloading information.

19. The apparatus of claim 18, wherein the receiver receives the message containing the bitloading information via the communications channel.

20. The apparatus of claim 18, wherein the bitloading control is configured to cause the transmitter to periodically transmit a probe message to the node, the bitloading data being received in response to the probe message.

21. The apparatus of claim 18, wherein the bitloading information is received at a rate that is controlled by the node such that the bitloading for the communications channel is dynamically updated.

22. A method comprising:
sending a message from a first node to a second node via a communications channel;
receiving at the first node a communication from the second node containing bitloading information that includes one of a first bitloading value based on a signal quality at the second node or a second bitloading value based on a measure of signal quality at the second node adjusted according to a prior indication of signal quality at the second node to account for non-stationary noise in the communications channel, wherein the measure of signal quality at the second node is increased by an amount based on the margin defined for the non-stationary noise in the communications channel; and using the received bitloading information to control bitloading for communications from the first node to the second node via the communications channel.

23. The method of claim 22, wherein the message is sent in response to a request from the second node.

24. The method of claim 22, further comprising storing bitloading data in memory of the first node based on the bitloading information to update bitloading for the communications from the first node to the second node via the communications channel.

* * * * *